US 8,224,468 B2

(12) United States Patent
Grichnik et al.

(10) Patent No.: US 8,224,468 B2
(45) Date of Patent: Jul. 17, 2012

(54) CALIBRATION CERTIFICATE FOR VIRTUAL SENSOR NETWORK (VSN)

(75) Inventors: Anthony J. Grichnik, Peoria, IL (US); James Mason, Peoria, IL (US); Tim Felty, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 1021 days.

(21) Appl. No.: 12/222,007

(22) Filed: Jul. 31, 2008

(65) Prior Publication Data

US 2009/0119065 A1    May 7, 2009

Related U.S. Application Data

(63) Continuation-in-part of application No. 11/979,408, filed on Nov. 2, 2007, now Pat. No. 8,036,764.

(51) Int. Cl.
*G06F 19/00* (2011.01)
*G05B 13/02* (2006.01)

(52) U.S. Cl. .............. 700/48; 700/31; 700/110; 701/29; 701/102; 702/182; 706/25; 714/47.2

(58) Field of Classification Search .............. 700/30–31, 700/40–45, 48, 110, 266; 701/1, 29, 102, 701/106; 706/23, 25; 702/182; 714/47.2
See application file for complete search history.

(56) References Cited

U.S. PATENT DOCUMENTS

| 3,316,395 A | 4/1967 | Lavin |
| 4,136,329 A | 1/1979 | Trobert |
| 4,533,900 A | 8/1985 | Muhlberger et al. |
| 5,014,220 A | 5/1991 | McMann et al. |
| 5,163,412 A | 11/1992 | Neu et al. |
| 5,262,941 A | 11/1993 | Saladin et al. |
| 5,341,315 A | 8/1994 | Niwa et al. |
| 5,377,122 A | 12/1994 | Werner et al. |
| 5,386,373 A | 1/1995 | Keeler et al. |
| 5,434,796 A | 7/1995 | Weininger |
| 5,539,638 A * | 7/1996 | Keeler et al. .................... 701/29 |

(Continued)

FOREIGN PATENT DOCUMENTS

EP         1103926         5/2001

(Continued)

OTHER PUBLICATIONS

Desantos et al., "Virtual Sensors for Walking Robots" pp. 191-211 (2006).

(Continued)

*Primary Examiner* — Albert Decady
*Assistant Examiner* — Douglas Lee
(74) *Attorney, Agent, or Firm* — Finnegan, Henderson, Farabow, Garrett & Dunner LLP (57) ABSTRACT

A method is used for providing sensing data to a control system of a machine. The method may include providing a plurality of virtual sensors, each of which may have a model type, at least one input parameter, and at least one output parameter. The method may also include integrating the plurality of virtual sensors into a virtual sensor network; determining interdependencies among the plurality of virtual sensors; and obtaining operational information of the plurality of virtual sensors. Further, the method may include recording measurement data and performance information of the virtual sensor network and the plurality of virtual sensors; and generating one or more calibration certificate of the virtual sensor network based on the operational information, the measurement data, and the performance information.

21 Claims, 6 Drawing Sheets

U.S. PATENT DOCUMENTS

| | | | |
|---|---|---|---|
| 5,548,528 A | 8/1996 | Keeler et al. |
| 5,561,610 A | 10/1996 | Schricker et al. |
| 5,566,091 A | 10/1996 | Schricker et al. |
| 5,585,553 A | 12/1996 | Schricker |
| 5,594,637 A | 1/1997 | Eisenberg et al. |
| 5,598,076 A | 1/1997 | Neubauer et al. |
| 5,604,306 A | 2/1997 | Schricker |
| 5,604,895 A | 2/1997 | Raimi |
| 5,608,865 A | 3/1997 | Midgely et al. |
| 5,666,297 A | 9/1997 | Britt et al. |
| 5,682,317 A | 10/1997 | Keeler et al. |
| 5,698,780 A | 12/1997 | Mizutani et al. |
| 5,727,128 A | 3/1998 | Morrison |
| 5,750,887 A | 5/1998 | Schricker |
| 5,752,007 A | 5/1998 | Morrison |
| 5,835,902 A | 11/1998 | Jannarone |
| 5,842,202 A | 11/1998 | Kon |
| 5,914,890 A | 6/1999 | Sarangapani et al. |
| 5,925,089 A | 7/1999 | Fujime |
| 5,950,147 A | 9/1999 | Sarangapani et al. |
| 5,966,312 A | 10/1999 | Chen |
| 5,970,426 A | 10/1999 | Mandel et al. |
| 5,987,976 A | 11/1999 | Sarangapani |
| 6,086,617 A | 7/2000 | Waldon et al. |
| 6,092,016 A | 7/2000 | Sarangapani et al. |
| 6,119,074 A | 9/2000 | Sarangapani |
| 6,145,066 A | 11/2000 | Atkin |
| 6,195,648 B1 | 2/2001 | Simon et al. |
| 6,199,007 B1 | 3/2001 | Zavarehi et al. |
| 6,208,982 B1 | 3/2001 | Allen, Jr. et al. |
| 6,223,133 B1 | 4/2001 | Brown |
| 6,236,908 B1 * | 5/2001 | Cheng et al. ..................... 701/1 |
| 6,240,343 B1 | 5/2001 | Sarangapani et al. |
| 6,269,351 B1 | 7/2001 | Black |
| 6,298,718 B1 | 10/2001 | Wang |
| 6,370,544 B1 | 4/2002 | Krebs et al. |
| 6,405,122 B1 | 6/2002 | Yamaguchi |
| 6,438,430 B1 | 8/2002 | Martin et al. |
| 6,442,511 B1 | 8/2002 | Sarangapani et al. |
| 6,477,660 B1 | 11/2002 | Sohner |
| 6,513,018 B1 | 1/2003 | Culhane |
| 6,546,379 B1 | 4/2003 | Hong et al. |
| 6,584,768 B1 | 7/2003 | Hecker et al. |
| 6,594,989 B1 | 7/2003 | Hepburn et al. |
| 6,698,203 B2 | 3/2004 | Wang |
| 6,711,676 B1 | 3/2004 | Zomaya et al. |
| 6,721,606 B1 | 4/2004 | Kaji et al. |
| 6,725,208 B1 | 4/2004 | Hartman et al. |
| 6,763,708 B2 | 7/2004 | Ting et al. |
| 6,775,647 B1 | 8/2004 | Evans et al. |
| 6,785,604 B2 | 8/2004 | Jacobson |
| 6,810,442 B1 | 10/2004 | Lin et al. |
| 6,823,675 B2 | 11/2004 | Brunell et al. |
| 6,853,920 B2 | 2/2005 | Hsiung et al. |
| 6,859,770 B2 | 2/2005 | Ramsey |
| 6,859,785 B2 | 2/2005 | Case |
| 6,865,883 B2 | 3/2005 | Gomulka |
| 6,882,929 B2 | 4/2005 | Liang et al. |
| 6,895,286 B2 | 5/2005 | Kaji et al. |
| 6,935,313 B2 | 8/2005 | Jacobson |
| 6,941,287 B1 | 9/2005 | Vaidyanathan et al. |
| 6,952,662 B2 | 10/2005 | Wegerich et al. |
| 6,976,062 B1 | 12/2005 | Denby et al. |
| 6,988,093 B2 | 1/2006 | Pic et al. |
| 7,000,229 B2 | 2/2006 | Gere |
| 7,024,343 B2 | 4/2006 | El-Ratal |
| 7,027,953 B2 | 4/2006 | Klein |
| 7,035,740 B2 | 4/2006 | Kermani |
| 7,035,834 B2 | 4/2006 | Jacobson |
| 7,117,079 B2 | 10/2006 | Streichsbier et al. |
| 7,124,047 B2 | 10/2006 | Zhang et al. |
| 7,127,892 B2 | 10/2006 | Akins et al. |
| 7,174,284 B2 | 2/2007 | Dolansky et al. |
| 7,178,328 B2 | 2/2007 | Solbrig |
| 7,191,161 B1 | 3/2007 | Rai et al. |
| 7,194,392 B2 | 3/2007 | Tuken et al. |
| 7,213,007 B2 | 5/2007 | Grichnik |
| 7,356,393 B1 | 4/2008 | Schlatre et al. |
| 7,369,925 B2 | 5/2008 | Morioka et al. |
| 7,542,600 B2 | 6/2009 | Yu et al. |
| 7,593,804 B2 | 9/2009 | Grichnik et al. |
| 7,693,683 B2 | 4/2010 | Ihara |
| 7,787,969 B2 | 8/2010 | Grichnik et al. |
| 7,917,333 B2 * | 3/2011 | Grichnik et al. ............. 702/182 |
| 2002/0014294 A1 | 2/2002 | Okano et al. |
| 2002/0016701 A1 | 2/2002 | Duret et al. |
| 2002/0042784 A1 | 4/2002 | Kerven et al. |
| 2002/0049704 A1 | 4/2002 | Vanderveldt et al. |
| 2002/0103996 A1 | 8/2002 | LeVasseur et al. |
| 2002/0146178 A1 | 10/2002 | Bolle et al. |
| 2002/0198821 A1 | 12/2002 | Munoz |
| 2003/0018503 A1 | 1/2003 | Shulman |
| 2003/0055607 A1 | 3/2003 | Wegerich et al. |
| 2003/0093250 A1 | 5/2003 | Goebel |
| 2003/0126053 A1 | 7/2003 | Boswell et al. |
| 2003/0126103 A1 | 7/2003 | Chen et al. |
| 2003/0130855 A1 | 7/2003 | Babu et al. |
| 2003/0167354 A1 | 9/2003 | Peppers et al. |
| 2003/0187567 A1 | 10/2003 | Sulatisky et al. |
| 2003/0187584 A1 | 10/2003 | Harris |
| 2003/0200296 A1 | 10/2003 | Lindsey |
| 2004/0022441 A1 | 2/2004 | Cecala et al. |
| 2004/0030420 A1 | 2/2004 | Ulyanov et al. |
| 2004/0034857 A1 | 2/2004 | Mangino et al. |
| 2004/0059518 A1 | 3/2004 | Rothschild |
| 2004/0077966 A1 | 4/2004 | Yamaguchi et al. |
| 2004/0122702 A1 | 6/2004 | Sabol et al. |
| 2004/0122703 A1 | 6/2004 | Walker et al. |
| 2004/0128058 A1 | 7/2004 | Andres et al. |
| 2004/0135677 A1 | 7/2004 | Asam |
| 2004/0138995 A1 | 7/2004 | Hershkowitz et al. |
| 2004/0153227 A1 | 8/2004 | Hagiwara et al. |
| 2004/0230404 A1 | 11/2004 | Messmer et al. |
| 2004/0267818 A1 | 12/2004 | Hartenstine |
| 2005/0047661 A1 | 3/2005 | Mauer |
| 2005/0055176 A1 | 3/2005 | Clarke et al. |
| 2005/0091093 A1 | 4/2005 | Bhaskaran et al. |
| 2005/0209943 A1 | 9/2005 | Ballow et al. |
| 2005/0210337 A1 | 9/2005 | Chester et al. |
| 2005/0240539 A1 | 10/2005 | Olavson |
| 2005/0261791 A1 | 11/2005 | Chen et al. |
| 2005/0262031 A1 | 11/2005 | Saidi et al. |
| 2005/0278227 A1 | 12/2005 | Esary et al. |
| 2005/0278432 A1 | 12/2005 | Feinleib et al. |
| 2006/0010057 A1 | 1/2006 | Bradway et al. |
| 2006/0010142 A1 | 1/2006 | Kim et al. |
| 2006/0010157 A1 | 1/2006 | Dumitrascu et al. |
| 2006/0025897 A1 | 2/2006 | Shostak et al. |
| 2006/0026270 A1 | 2/2006 | Sadovsky et al. |
| 2006/0026587 A1 | 2/2006 | Lemarroy et al. |
| 2006/0064474 A1 | 3/2006 | Feinleib et al. |
| 2006/0068973 A1 | 3/2006 | Kappauf et al. |
| 2006/0129289 A1 | 6/2006 | Kumar et al. |
| 2006/0130052 A1 | 6/2006 | Allen et al. |
| 2006/0210168 A1 | 9/2006 | Kim et al. |
| 2006/0229753 A1 | 10/2006 | Seskin et al. |
| 2006/0229769 A1 | 10/2006 | Grichnik et al. |
| 2006/0229852 A1 | 10/2006 | Grichnik et al. |
| 2006/0229854 A1 | 10/2006 | Grichnik et al. |
| 2006/0230018 A1 | 10/2006 | Grichnik et al. |
| 2006/0230097 A1 | 10/2006 | Grichnik et al. |
| 2006/0230313 A1 | 10/2006 | Grichnik et al. |
| 2006/0241923 A1 | 10/2006 | Xu et al. |
| 2006/0245631 A1 | 11/2006 | Levenson et al. |
| 2006/0247798 A1 | 11/2006 | Subbu et al. |
| 2007/0061144 A1 | 3/2007 | Grichnik et al. |
| 2007/0094048 A1 | 4/2007 | Grichnik |
| 2007/0094181 A1 | 4/2007 | Tayebnejad et al. |
| 2007/0118338 A1 | 5/2007 | Grichnik et al. |
| 2007/0124237 A1 | 5/2007 | Sundararajan et al. |
| 2007/0150332 A1 | 6/2007 | Grichnik et al. |
| 2007/0168494 A1 | 7/2007 | Liu et al. |
| 2007/0179769 A1 | 8/2007 | Grichnik et al. |
| 2007/0203864 A1 | 8/2007 | Grichnik |
| 2008/0154811 A1 | 6/2008 | Grichnik et al. |
| 2008/0201054 A1 | 8/2008 | Grichnik et al. |
| 2008/0243354 A1 | 10/2008 | Grichnik et al. |

| | | | |
|---|---|---|---|
| 2009/0112445 | A1* | 4/2009 | Wills .......................... 701/108 |
| 2009/0119065 | A1* | 5/2009 | Grichnik et al. ............. 702/182 |
| 2010/0050025 | A1 | 2/2010 | Grichnik et al. | |

FOREIGN PATENT DOCUMENTS

| | | |
|---|---|---|
| EP | 1367248 | 12/2003 |
| EP | 1418481 | 5/2004 |
| JP | 10-160213 | 6/1998 |
| JP | 10-332621 | 12/1998 |
| JP | 11-351045 | 12/1999 |
| JP | 2001-082192 | 3/2001 |
| JP | 2002-276344 | 9/2002 |
| WO | WO97/42581 | 11/1997 |
| WO | WO02/057856 | 7/2002 |
| WO | WO2006/017453 | 2/2006 |

OTHER PUBLICATIONS

Ghysels et al., "Testing for Structural Change in the Presence of Auxiliary Models" pp. 1-41 (2001).

Liu et al., "Specification Tests in the Efficient Method of Moments Framework with Application to the Stochastic Volatility Models" Carnegie Mellon University, pp. 1-31 (1996).

Oberstar, "Fixed-Point Representation & Fractional Math," Aug. 30, 2007, Oberstar Consulting, pp. 1-18.

Office Action issued in U.S. Appl. No. 11/642,913 on Apr. 30, 2010 (28 pages).

Office Action issued in U.S. Appl. No. 11/642,913 on Sep. 16, 2010 (16 pages).

Office Action issued in U.S. Appl. No. 12/222,957 on Apr. 28, 2010 (18 pages).

Office Action issued in U.S. Appl. No. 11/979,408 on Dec. 7, 2010 (7 pages).

Tilak, "Dynamic Resources Discovery for Sensor Networks," UCSD Publication, pp. 785-796 (2005).

Traver et al., "A Neural Network-Based Virtual NOx Sensor for Diesel Engines," West Virginia University, Mechanical and Aerospace Engineering Dept., Morgantown, WV 26506-6106 (2000).

Allen et al., "Supersaturated Designs That Maximize the Probability of Identifying Active Factors," 2003 American Statistical Association and the American Society for Quality, Technometrics, vol. 45, No. 1, Feb. 2003, pp. 1-8.

April, Jay et al., "Practical Introduction to Simulation Optimization," Proceedings of the 2003 Winter Simulation Conference, pp. 71-78.

Bandte et al., "Viable Designs Through a Joint Probabilistic Estimation Technique," SAE International, and the American Institute of Aeronautics and Astronautics, Inc., Paper No. 1999-01-5623, 1999, pp. 1-11.

Beisl et al., "Use of Genetic Algorithm to Identify the Source Point of Seepage Slick Clusters Interpreted from Radarsat-1 Images in the Gulf of Mexico," Geoscience and Remote Sensing Symposium, 2004, Proceedings, 2004 IEEE International Anchorage, AK, Sep. 20-24, 2004, vol. 6, Sep. 20, 2004, pp. 4139-4142.

Berke et al., "Optimum Design of Aerospace Structural Components Using Neural Networks," Computers and Structures, vol. 48, No. 6, Sep. 17, 1993, pp. 1001-1010.

Bezdek, "Genetic Algorithm Guided Clustering," IEEE 0-7803-1899-4/94, 1994, pp. 34-39.

Brahma et al., "Optimization of Diesel Engine Operating Parameters Using Neural Networks," SAE Technical Paper Series, 2003-01-3228, Oct. 27-30, 2003 (11 pages).

Chau et al., "Use of runs test to access cardiovascular autonomic function in diabetic subjects," Abstract, Diabetes Care, vol. 17, Issue 2, pp. 146-148, available at http://care.diabetesjournals.org/cgi/content/abstract/17/2/146).

Chung et al., "Process Optimal Design in Forging by Genetic Algorithm," Journal of Manufacturing Science and Engineering, vol. 124, May 2002, pp. 397-408.

Cox et al., "Statistical Modeling for Efficient Parametric Yield Estimation of MOS VLSI Circuits," IEEE, 1983, pp. 242-245.

De Maesschalck et al., "The Mahalanobis Distance," Chemometrics and Intelligent Laboratory Systems, vol. 50, No. 1, Jan. 2000, pp. 1-18.

Dikmen et al., "Estimating Distributions in Genetic Algorithms," ISCIS 2003, LNCS 2869, 2003, pp. 521-528.

Galperin, G., et al., "Parallel Monte-Carlo Simulation of Neural Network Controllers," available at http://www-fp.mcs.anl.gov/ccst/research/reports_pre1998/neural_network/galperin.html, printed Mar. 11, 2005 (6 pages).

Gletsos et al., "A Computer-Aided Diagnostic System to Characterize CT Focal Liver Lesions: Design and Optimization of a Neural Network Classifier," IEEE Transactions on InformationTechnology in Biomedicine, vol. 7, No. 3, Sep. 2003 pp. 153-162.

Grichnik et al., "An Improved Metric for Robust Engineering," Proceedings of the 2007 International Conference on Scientific Computing, Las Vegas, NV (4 pages).

Grichnik et al., Copending U.S. Appl. No. 11/979,408, filed Nov. 2, 2007, entitled Virtual Sensor Network (VSN) System and Method.

Holland, John H., "Genetic Algorithms," Scientific American, Jul. 1992, pp. 66-72.

Hughes et al., "Linear Statistics for Zeros of Riemann's Zeta Function," C.R. Acad. Sci. Paris, Ser. 1335 (2002), pp. 667-670.

Ko et al., "Application of Artificial Neural Network and Taguchi Method to Perform Design in Metal Forming Considering Workability," International Journal of Machine Tools & Manufacture, vol. 39, No. 5, May 1999, pp. 771-785.

Kroha et al., "Object Server on a Parallel Computer," 1997 IEEE 0-8186-8147-0/97, pp. 284-288.

Mavris et al., "A Probabilistic Approach to Multivariate Constrained Robust Design Simulation," Society of Automotive Engineers, Inc., Paper No. 975508, 1997, pp. 1-11.

National Institute of Health, "10-year CVD Risk Calculator" available at http://hin.nhlbi.nih.gov/atpiii/calculator.asp?usertype=prof, printed Aug. 2, 2005, 2 pages.

Obayashi et al, "Multiobjective Evolutionary Computation for Supersonic Wing-Shape Optimization," IEEE Transactions on Evolutionary Computation, vol. 4, No. 2, Jul. 2000, pp. 182-187.

Simpson et al., "Metamodels for Computer-Based Engineering Design: Survey & Recommendations," Engineering with Computers, 2001, vol. 17, pp. 129-150.

Solar Turbines, "InSight System," Oct. 19, 2006, http://mysolar.cat.com.

Solar Turbines, "InSight Systems, Machinery Management Solutions," Oct. 19, 2006.

Song, "The Hyperellipsoidal Clustering Using Genetic Algorithm," 1997 IEEE International Conference on Intelligent Processing Systems, Oct. 28-31, 1997, Beijing, China, pp. 592-596.

Sytsma, Sid, "Quality and Statistical Process Control," available at http://www.sytsma.com/tqmtools/ctlchtprinciples.html, printed Apr. 7, 2005, 6 pages.

Taguchi et al., "The Mahalanobis-Taguchi Strategy," A Pattern Technology System, John Wiley & Sons, Inc., 2002, 234 pages.

Woodall, Tsui et al., "A Review and Analysis of the Mahalanobis-Taguchi System," Technometrics, Feb. 2003, vol. 45, No. 1 (15 pages).

Wu et al., "Cam-phasing Optimization Using Artificial Neural Networks as Surrogate Models—Fuel Consumption and Nox Emissions," SAE Technical Paper Series, 2006-01-1512, Apr. 3-6, 2006 (19 pages).

Yang et al., "Similar Cases Retrieval from the Database of Laboratory Test Results," Journal of Medical Systems, vol. 27, No. 3, Jun. 2003, pp. 271-282.

Yuan et al., "Evolutionary Fuzzy C-Means Clustering Algorithm," 1995 IEEE 0-7803-2461-7/95, pp. 2221-2226.

Taylor et al., Guidelines for Evaluating and Expressing the Uncertainty of NIST Measurement Results, NIST Technical Note 1297, 1994 Edition, U.S. Dept. of Commerce, National Institute of Standards and Technology (25 pages).

Thompson et al., "Neural Network Modelling of the Emissions and Performance of a Heavy-Duty Diesel Engine," Proc. Instu. Mech. Engrs., vol. 214, Part D (2000), pp. 111-126.

Traver et al., "A Neural Network-Based Virtual NOx Sensor for Diesel Engines", West Virginia University, Mechanical and Aerospace Engineering Dept., Morgantown, WV 26506-6106.

Traver et al., Neural Network-Based Diesel Engine Emissions Prediction Using In-Cylinder Combustion Pressure, SAE Technical Paper Series, 1999-01-1532, May 3-6, 1999 (17 pages).

Grichnik et al., U.S. Appl. No. 11/812,164, filed Jun. 15, 2007.

Grichnik et al., U.S. Appl. No. 11/529,267, filed Sep. 29, 2006.

* cited by examiner

CALIBRATION CERTIFICATE FOR VIRTUAL SENSOR NETWORK (VSN)

CROSS REFERENCES

This application is a continuation-in-part (CIP) application of U.S. patent application Ser. No. 11/979,408, filed Nov. 2, 2007 now U.S. Pat. No. 8,036,764, to Anthony Grichnik et al., of which this application claims the benefit of priority.

TECHNICAL FIELD

This disclosure relates generally to computer based virtual sensor techniques and, more particularly, to virtual sensor network systems and methods.

BACKGROUND

Physical sensors are widely used in many products, such as modern machines, to measure and monitor physical phenomena, such as temperature, speed, and emissions from motor vehicles. Physical sensors often take direct measurements of the physical phenomena and convert these measurements into measurement data to be further processed by control systems. Although physical sensors take direct measurements of the physical phenomena, physical sensors and associated hardware are often costly and, sometimes, unreliable. Further, when control systems rely on physical sensors to operate properly, a failure of a physical sensor may render such control systems inoperable. For example, the failure of an intake manifold pressure sensor in an engine may result in shutdown of the engine entirely even if the engine itself is still operable.

Instead of direct measurements, virtual sensors have been developed to process other various physically measured values and to produce values that were previously measured directly by physical sensors. For example, U.S. Pat. No. 5,386,373 (the '373 patent) issued to Keeler et al. on Jan. 31, 1995, discloses a virtual continuous emission monitoring system with sensor validation. The '373 patent uses a back propagation-to-activation model and a monte-carlo search technique to establish and optimize a computational model used for the virtual sensing system to derive sensing parameters from other measured parameters.

A modern machine may need multiple sensors to function properly, and multiple virtual sensors may be used. However, conventional multiple virtual sensors are often used independently without taking into account other virtual sensors in an operating environment, which may result in undesired results. For example, multiple virtual sensors may compete for limited computing resources, such as processor, memory, or I/O, etc. An output of one virtual sensor model could also inadvertently becomes an input to another virtual sensor model, which can result in unpredictable effects in complex control systems relying on these values. Further, other types of interactions among the multiple virtual sensors may cause undesired or unpredictable results, such as feedback loops or transient control instabilities.

Further, conventional multiple virtual sensors are often incapable of being calibrated to provide users information such as sensing range, uncertainty, and sensing conditions, etc., about the multiple virtual sensors and, more specifically, the multiple virtual sensors as a whole.

Methods and systems consistent with certain features of the disclosed systems are directed to solving one or more of the problems set forth above.

SUMMARY

One aspect of the present disclosure includes a method for providing sensing data to a control system of a machine. The method may include providing a plurality of virtual sensors, each of which may have a model type, at least one input parameter, and at least one output parameter. The method may also include integrating the plurality of virtual sensors into a virtual sensor network; determining interdependencies among the plurality of virtual sensors; and obtaining operational information of the plurality of virtual sensors. Further, the method may include recording measurement data and performance information of the virtual sensor network and the plurality of virtual sensors; and generating one or more calibration certificate of the virtual sensor network based on the operational information, the measurement data, and the performance information.

Another aspect of the present disclosure includes a virtual sensor network system. The virtual sensor system may include a plurality of virtual sensors, an input interface to obtain data from corresponding physical sensors; and an output interface to provide data to a control system. Each of the plurality of virtual sensors may have a model type, at least one input parameter, and at least one output parameter. The plurality of virtual sensors may be integrated into a virtual sensor network. Further, the virtual sensor network system may include a controller and the controller may be configured to determine interdependencies among the plurality of virtual sensors. The controller may also be configured to obtain operational information of the plurality of virtual sensors; to record measurement data and performance information of the virtual sensor network and the plurality of virtual sensors; and to generate one or more calibration certificate of the virtual sensor network based on the operational information, the measurement data, and the performance information.

Another aspect of the present disclosure includes a machine. The machine may include an engine to provide power for the machine; an engine electronic control module (ECM) for controlling the engine; and a plurality of physical sensors providing sensing data to the engine ECM. The machine may also include a virtual sensor network system for providing predicted sensing data to the engine ECM. The virtual sensor network system includes a plurality of virtual sensors, each of which may have a model type, at least one input parameter, and at least one output parameter, integrated into a virtual sensor network. The virtual sensor network system may also include an input interface to obtain data from the plurality of physical sensors; an output interface to provide data to the engine ECM; and a controller. The controller may be configured to determine interdependencies among the plurality of virtual sensors; and to obtain operational information of the plurality of virtual sensors. The controller may also be configured to record measurement data and performance information of the virtual sensor network and the plurality of virtual sensors; and to generate one or more calibration certificate of the virtual sensor network based on the operational information, the measurement data, and the performance information.

DETAILED DESCRIPTION

Reference will now be made in detail to exemplary embodiments, which are illustrated in the accompanying drawings. Wherever possible, the same reference numbers will be used throughout the drawings to refer to the same or like parts.

Figure 1:
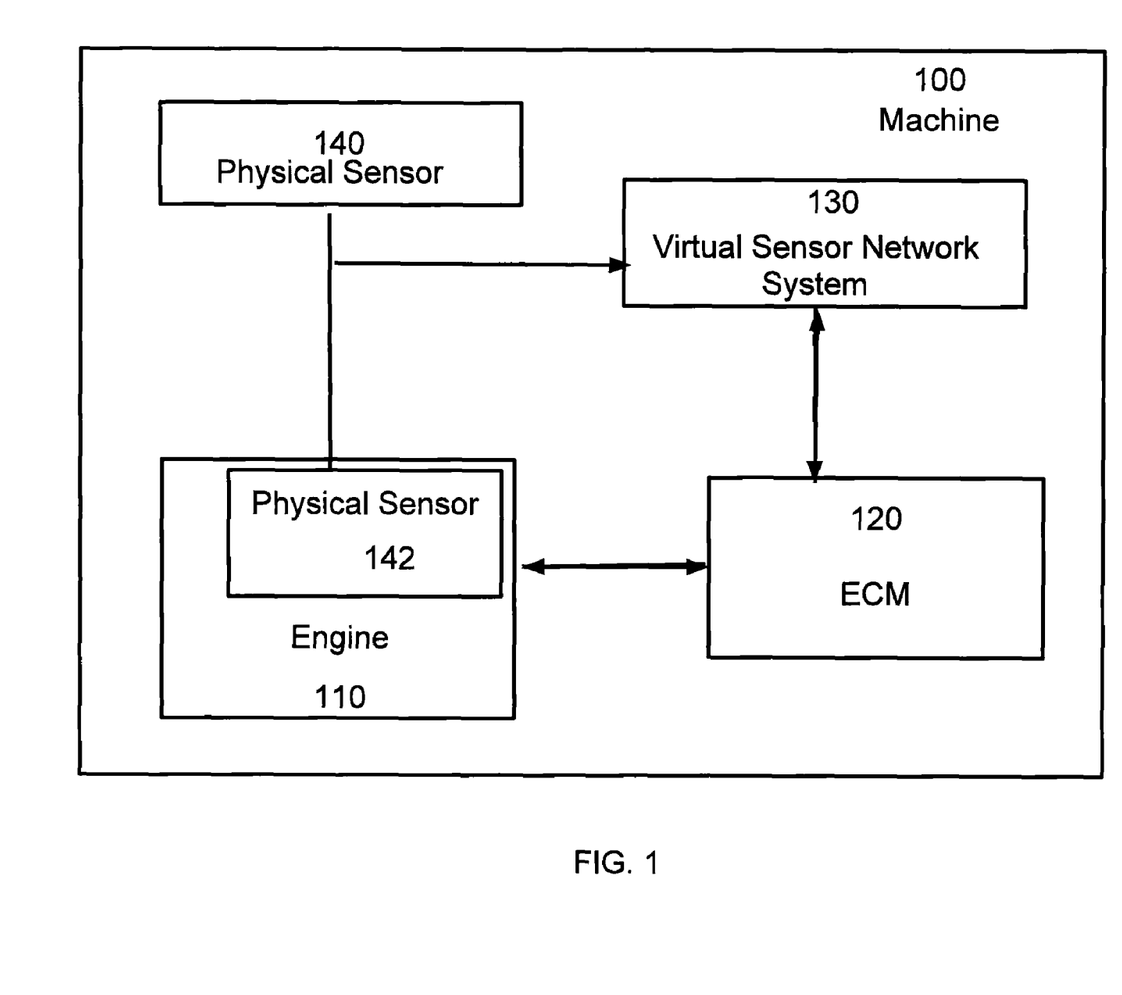
FIG. 1 illustrates an exemplary block diagram of a machine in which features and principles consistent with certain disclosed embodiments may be incorporated.

FIG. 1 illustrates an exemplary machine 100 in which features and principles consistent with certain disclosed embodiments may be incorporated. Machine 100 may refer to any type of stationary or mobile machine that performs some type of operation associated with a particular industry. Machine 100 may also include any type of commercial vehicle such as cars, vans, and other vehicles. Other types of machines may also be included.

As shown in FIG. 1, machine 100 may include an engine 110, an electronic control module (ECM) 120, a virtual sensor network system 130, and physical sensors 140 and 142. Engine 110 may include any appropriate type of engine or power source that generates power for machine 100, such as an internal combustion engine or fuel cell generator. ECM 120 may include any appropriate type of engine control system configured to perform engine control functions such that engine 110 may operate properly. ECM 120 may include any number of devices, such as microprocessors or microcontrollers, memory modules, communication devices, input/output devices, storages devices, etc., to perform such control functions. Further, computer software instructions may be stored in or loaded to ECM 120. ECM 120 may execute the computer software instructions to perform various control functions and processes.

Although ECM 120 is shown to control engine 110 (an engine ECM), ECM 120 may also control other systems of machine 100, such as transmission systems, and/or hydraulics systems, etc. Multiple ECMs may be included in ECM 120 or may be used on machine 100. For example, a plurality of ECMs may be used to control different systems of machine 100 and also to coordinate operations of these systems. Further, the plurality of ECMs may be coupled together via a communication network to exchange information. Information such as input parameters, output parameters, and parameter values, status of control systems, physical and virtual sensors, and virtual sensor networks may be communicated to the plurality of ECMs simultaneously.

Physical sensor 140 may include one or more sensors provided for measuring certain parameters of machine operating environment. For example, physical sensor 140 may include physical emission sensors for measuring emissions of machine 100, such as Nitrogen Oxides ($NO_x$), Sulfur Dioxide ($SO_2$), Carbon Monoxide (CO), total reduced Sulfur (TRS), etc. In particular, $NO_x$ emission sensing and reduction may be important to normal operation of engine 110. Physical sensor 142, on the other hand, may include any appropriate sensors that are used with engine 110 or other machine components (not shown) to provide various measured parameters about engine 110 or other components, such as temperature, speed, acceleration rate, fuel pressure, power output, etc.

Virtual sensor network system 130 may be coupled with physical sensors 140 and 142 and ECM 120 to provide control functionalities based on integrated virtual sensors. A virtual sensor, as used herein, may refer to a mathematical algorithm or model that produces output measures comparable to a physical sensor based on inputs from other systems, such as physical sensors 140 and 142. For example, a physical $NO_x$ emission sensor may measure the $NO_x$ emission level of machine 100 and provide values of $NO_x$ emission level to other components, such as ECM 120; while a virtual $NO_x$ emission sensor may provide calculated values of $NO_x$ emission level to ECM 120 based on other measured or calculated parameters, such as such as compression ratios, turbocharger efficiency, aftercooler characteristics, temperature values, pressure values, ambient conditions, fuel rates, and engine speeds, etc. The term "virtual sensor" may be used interchangeably with "virtual sensor model."

A virtual sensor network, as used herein, may refer to a collection of virtual sensors integrated and working together using certain control algorithms such that the collection of virtual sensors may provide more desired or more reliable sensor output parameters than discrete individual virtual sensors. Virtual sensor network system 130 may include a plurality of virtual sensors configured or established according to certain criteria based on a particular application. Virtual sensor network system 130 may also facilitate or control operations of the plurality virtual sensors. The plurality virtual sensors may include any appropriate virtual sensor providing sensor output parameters corresponding to one or more physical sensors in machine 100.

Figure 2:
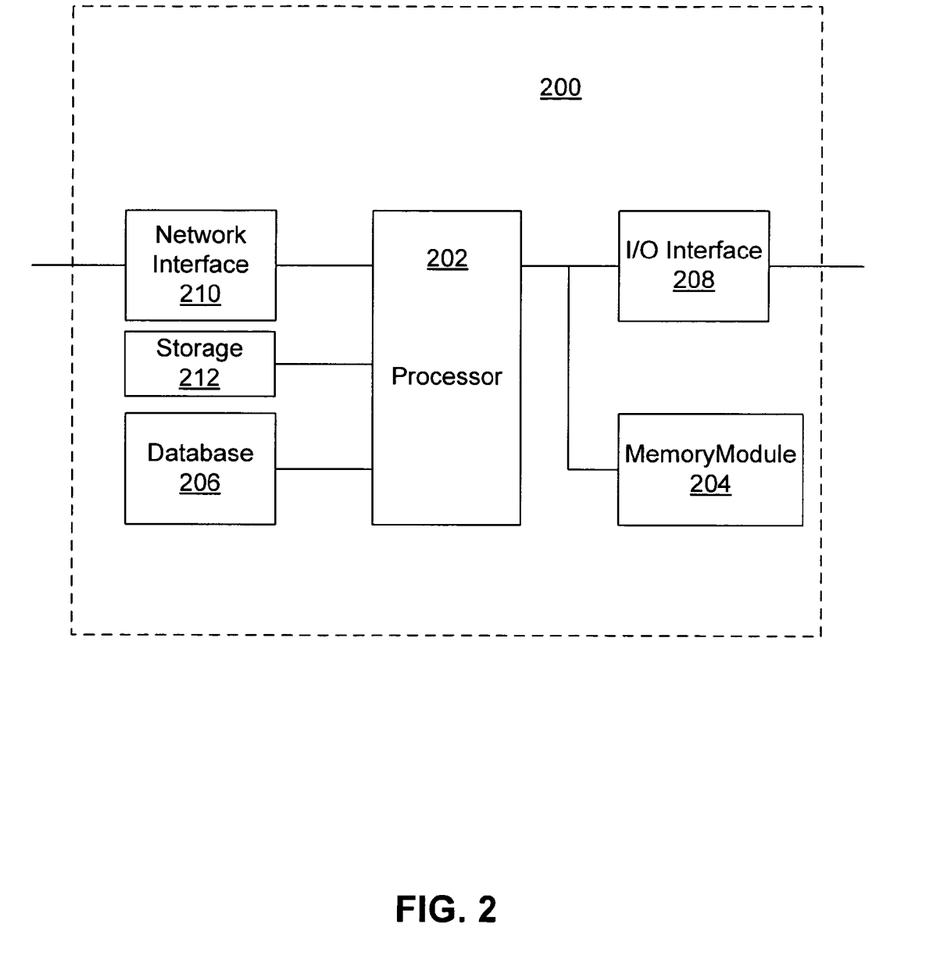
FIG. 2 illustrates a logical block diagram of an exemplary computer system consistent with certain disclosed embodiments.

Further, virtual sensor network system 130 may be configured as a separate control system or, alternatively, may coincide with other control systems such as ECM 120. Virtual sensor network system 130 may also operate in series with or in parallel to ECM 120. Virtual sensor network system 130 and/or ECM 120 may be implemented by any appropriate computer system. FIG. 2 shows an exemplary functional block diagram of a computer system 200 configured to implement virtual sensor network system 130 and/or ECM 120. Computer system 200 may also include any appropriate computer system configured to design, train, and validate virtual sensors in virtual sensor network 130 and other component of machine 100.

As shown in FIG. 2, computer system 200 (e.g., virtual sensor network system 130, etc.) may include a processor 202, a memory module 204, a database 206, an I/O interface 208, a network interface 210, and a storage 212. Other components, however, may also be included in computer system 200.

Processor 202 may include any appropriate type of general purpose microprocessor, digital signal processor, or microcontroller. Processor 202 may be configured as a separate processor module dedicated to controlling engine 110. Alternatively, processor 202 may be configured as a shared processor module for performing other functions unrelated to virtual sensors.

Memory module 204 may include one or more memory devices including, but not limited to, a ROM, a flash memory, a dynamic RAM, and a static RAM. Memory module 204 may be configured to store information used by processor 202. Database 206 may include any type of appropriate database containing information on characteristics of measured parameters, sensing parameters, mathematical models, and/or any other control information.

Further, I/O interface 208 may also be configured to obtain data from various sensors or other components (e.g., physical sensors 140 and 142) and/or to transmit data to these components and to ECM 120. Network interface 210 may include any appropriate type of network device capable of communicating with other computer systems based on one or more wired or wireless communication protocols. Storage 212 may include any appropriate type of mass storage provided to store any type of information that processor 202 may need to operate. For example, storage 212 may include one or more hard disk devices, optical disk devices, or other storage devices to provide storage space. Any or all of the components of computer system 200 may be implemented or integrated into an application specific integrated circuit (ASIC) or field programmable gate array (FPGA) device.

Figure 3:
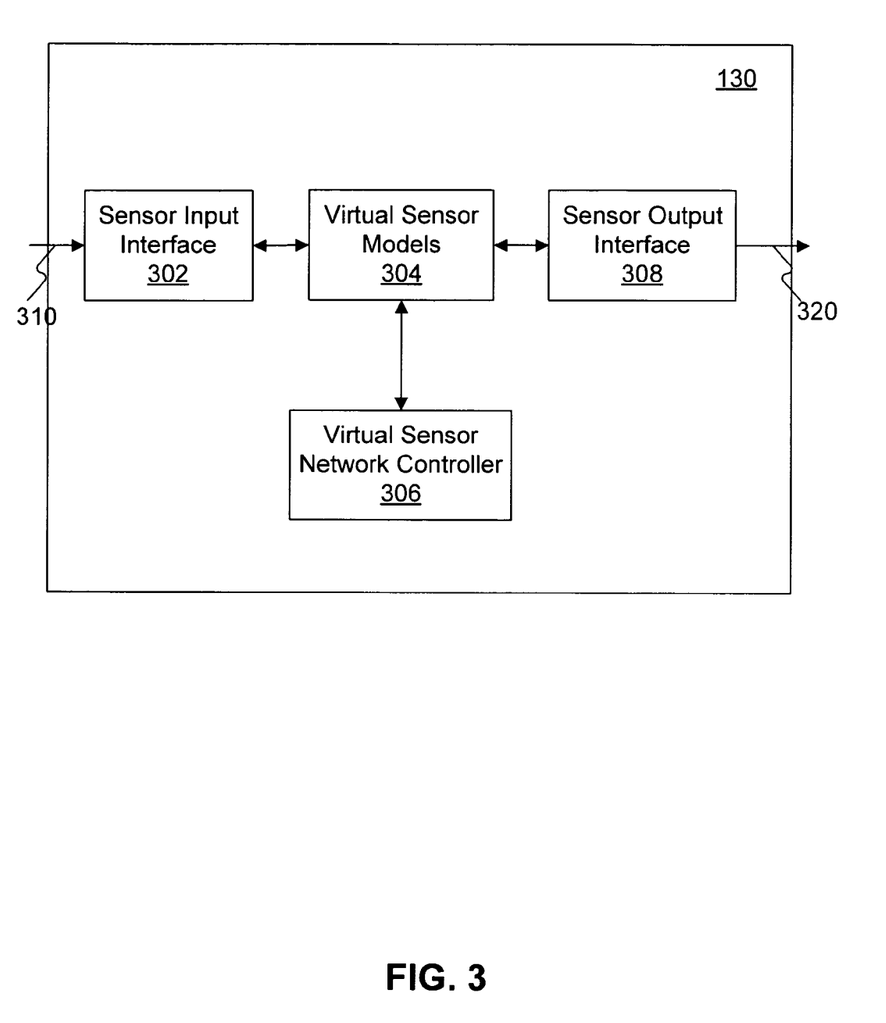
FIG. 3 illustrates a block diagram of an exemplary virtual sensor network system consistent with certain disclosed embodiments.

FIG. 3 shows a functional block diagram of virtual sensor network system 130 consistent with the present invention. As shown in FIG. 3, virtual sensor network system 130 may include a sensor input interface 302, virtual sensor models 304, a virtual sensor network controller 306, and a sensor output interface 308. Input parameters 310 are provided to sensor input interface 302 and output parameters 320 are provided by sensor output interface 308.

As explained above, a virtual sensor network may refer to a plurality of virtual sensor models integrated as a collection of virtual sensors to provide sensing functionalities under a central control unit. Virtual sensor network 130 is not a simple or mechanical aggregation of multiple virtual sensor models. The plurality of virtual sensors in a virtual sensor network may be integrated to fit a particular system, and the operation of the plurality of virtual sensors may be controlled collectively.

Sensor input interface 302 may include any appropriate interface, such as an I/O interface or a data link, etc., configured to obtain information from various physical sensors (e.g., physical sensors 140 and 142). The information may include values of input or control parameters of the physical sensors, operational status of the physical sensors, and/or values of output parameters of the physical sensors. Further, the information may be provided to sensor input interface 302 as inputs 310.

Sensor output interface 308 may include any appropriate interface, such as an I/O interface, or an ECM/xPC interface, etc., configured to provide information from virtual sensor models 304 and virtual sensor network controller 306 to external systems, such as ECM 120, or to an external user of virtual sensor network 120. The information may be provided to external systems and/or users as output 320.

Virtual sensor models 304 may include a plurality of virtual sensors, such as virtual emission sensors, virtual fuel sensors, and virtual speed sensors, etc. Any virtual sensor may be included in virtual sensor models 304.

A virtual sensor model may require a certain amount of computational resource to be operational. For example, a virtual sensor model may need to be stored in a certain amount of memory. The program code and data of the virtual sensor model may be loaded into memory to be executed by a processor. And the execution of the virtual sensor model may require a certain amount of processing time of the processor. Other computational resources, such as I/O operations, display operations, etc., may also be required by the virtual sensor model.

The overall computational resources required by a virtual sensor model may be referred to as a footprint of the virtual sensor model. The size of the footprint, i.e., the overall amount of the required computational resources, may relate to the complexity of the virtual sensor model, the type of the virtual sensor model, and accuracy of the virtual sensor.

Figure 4:
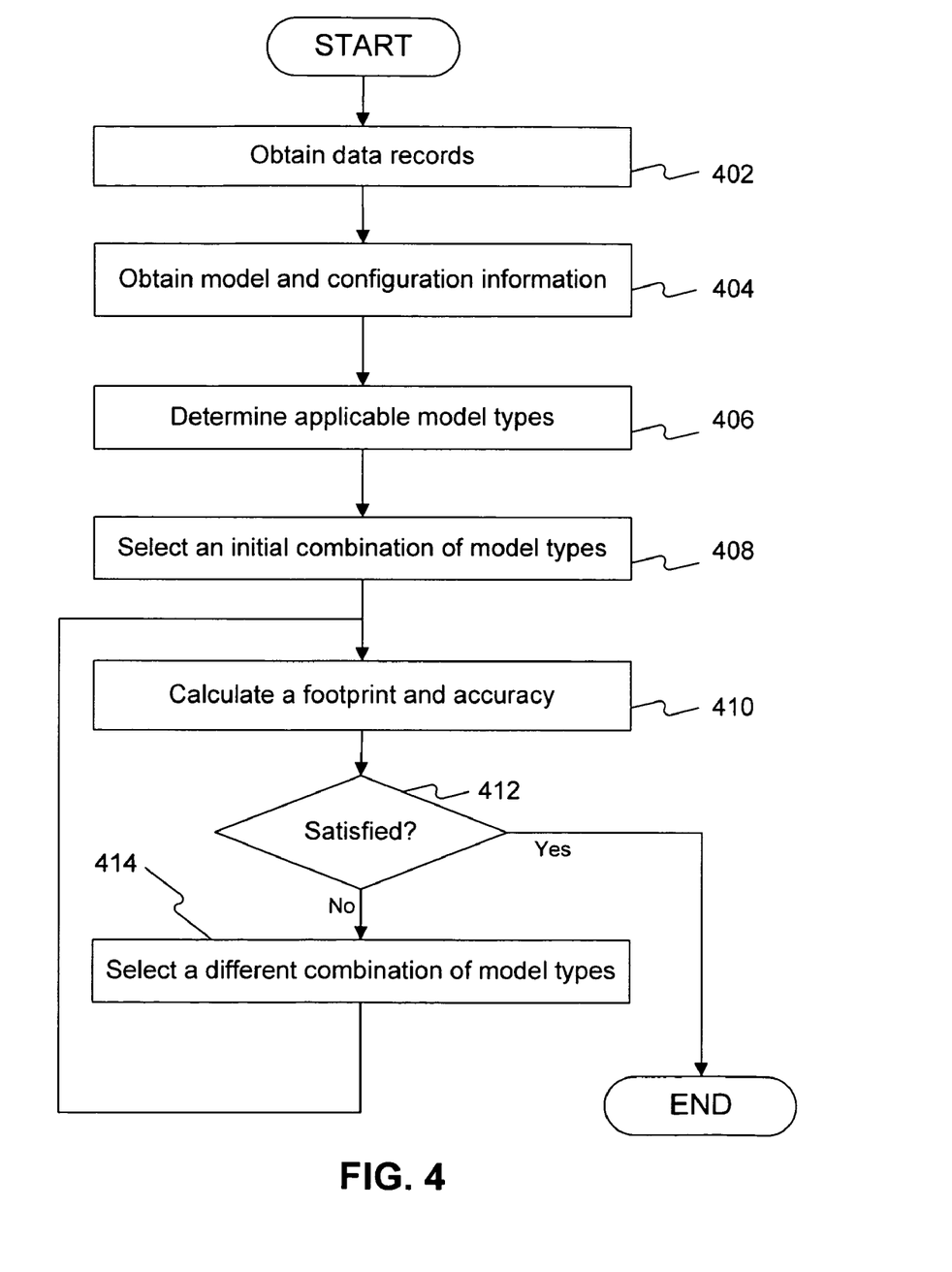
FIG. 4 shows a flow chart of an exemplary virtual sensor integration process consistent with certain disclosed embodiments.

A footprint of a virtual sensor network may include footprints of all virtual sensors in the virtual sensor network plus a certain amount of computational resources required by certain virtual sensor network functionalities, such as control and validation functions. The plurality of virtual sensors may be integrated into virtual sensor models 304 of virtual sensor network system 130 by, for example, computer system 200 such that the footprint for virtual sensor network 130 may be desired or optimized. FIG. 4 shows an exemplary integration process.

As shown in FIG. 4, computer system 200, or processor 202, may obtain data records corresponding to a plurality of virtual sensors of virtual sensor network (step 402). The data records may include, for example, information characterizing engine operations and emission levels including $NO_x$ emission levels. ECM 120 and/or physical sensors 140 and 142, such as physical $NO_x$ emission sensors, may be provided to generate data records, such as intake manifold temperature, intake manifold pressure, ambient humidity, fuel rates, and engine speeds, etc.

Further, the data records may be collected based on various engines or based on a single test engine, under various predetermined operational conditions. The data records may also be collected from experiments designed for collecting such data. Alternatively, the data records may be generated artificially by other related processes, such as other emission modeling, simulation, or analysis processes.

The data records may include different sets of data. For example, two sets of data records may be obtained. A first set of data records may be used as training data to build virtual sensor network system 130. A second set of data may be provided as testing data to test and validate virtual sensor network 130. Other sets of data, such as simulation data and optimization data, may also be provided.

After obtaining the data records (step 402), processor 202 may obtain model and configuration information of virtual sensor models 304 (step 404). The model and configuration information may include any appropriate information to establish, configure, and control the plurality of virtual sensors of virtual sensor models 304. For example, processor 202 may obtain model type information and structural information of the plurality of virtual sensors of virtual sensor models 304.

A model type may refer to mathematical characteristics of a virtual sensor model. For example, a virtual sensor model type may include a decision tree model, a linear model, a nonlinear regression model, a linear multiple regression model, a time-lag model, and a neural network model.

A decision tree model may refer to a predictive model mapping from observations about an item to conclusions about its target value. The decision tree model may include a classification tree (discrete outcome) or regression tree (continuous outcome), where leaves may represent classifications and branches may represent conjunctions of features that lead to those classifications.

A linear model may be represented by $Y=X\beta+\epsilon$, where n and p are integers and Y is an n×1 column vector of random variables, X is an n×p matrix of "known" (i.e. observable and non-random) quantities, whose rows correspond to statistical units, $\beta$ is a p×1 vector of (unobservable) parameters, and $\epsilon$ is an n×1 vector of "errors", which are uncorrelated random variables each with expected value 0 and variance $\sigma^2$. The values of the parameters $\beta$ and $\sigma^2$ may be inferred using a method of maximum likelihood.

A nonlinear regression model may be represented by $y=b_1 x^1+b_2 x^2+ \ldots +b_n x^n+c$, where $b_1$-$b_n$ are the regression coefficients, representing the amount the dependent variable y changes when the corresponding independent changes 1 unit. The c is the constant corresponding to where the regression line intercepts the y axis, and representing the amount the dependent y will be when the independent variable is 0. A nonlinear regression model may be used to establish that an independent variable explains a proportion of the variance in a dependent variable at a significant level and the relative predictive importance of the independent variable with respect to certain nonlinear effects.

A linear multiple regression model may be represented by $y = b_1 x_1 + b_2 x_2 + \ldots + b_n x_n + c$, where $b_1$-$b_n$ are the regression coefficients, representing the amount the dependent variable y changes when the corresponding independent variables $x_1 \ldots x_n$ change by 1 unit. The c is the constant corresponding to where the regression line intercepts the y axis, and representing the amount the dependent y will be when all the independent variables are 0. A multiple regression model may be used to establish that a set of independent variables explains a proportion of the variance in a dependent variable at a significant level and the relative predictive importance of the independent variables. Nonlinear multiple regression models can be constructed in similar fashion by applying various or multiple exponential characteristics to independent variables specified.

A time-lag model may refer to any appropriate linear or nonlinear model with a certain time lag applied to the independent variables. For instance, a simple linear model of the form $y = mx + b$ can be transformed to a time-lagged linear model of the form $y_t = mx_{t-n} + b$ where t represents time, and n represents desired number of lags of x in time prior to t to produce the desired estimated of y at the current time.

Further, a neural network model may refer to an interconnected group of artificial neurons (i.e., a simple processing element) that uses a mathematical or computational model for information processing based on a connectionist approach to computation. The neural network may be an adaptive system that changes its structure based on external or internal information that flows through the network. Any types of neural network models may be used. It is understood that the above model types are listed for exemplary purposes, other model types may also be used.

Structural information of a virtual sensor model may be used by processor 202 to change model type of the virtual sensor model. For example, processor 202 may change a virtual sensor model from a linear model to a neural network model. The different models corresponding to different model types may be created in real-time based on the structural information, or may be pre-established.

Processor 202 may also determine applicable model types supported by each virtual sensor model (step 406). For example, for a particular virtual sensor model, processor 202 may determine different types of models upon which the virtual sensor can be built. The models of different types may be pre-established or may be established by processor 202 in real-time.

Processor 202 may select an initial combination of model types for virtual sensor models 304 (step 408). For each of plurality of the virtual sensor models 304, processor 202 may select an initial model type. For example, processor 202 may select a neural network model for an emission virtual sensor, and may select linear model for a temperature virtual sensor, etc. Any appropriate combination of different or same types may be used.

After selecting the model type (step 408), processor 202 may calculate a footprint and accuracy of virtual sensor models 304 (step 410). Processor 202 may calculate an individual footprint and accuracy of each of the virtual sensor models 304, and then calculate an overall footprint and accuracy of the virtual sensor models 304 based on individual footprints and accuracy. Footprint may increase in a sequential order for decision tree model type, linear model type, nonlinear regression model type, linear multiple regression model type, time-lag linear model type, and neural network model type. Accuracy may depend upon a particular application, and may increase in a sequential order for the decision tree model type, linear model type, nonlinear regression model type, linear multiple regression model type, time-lag linear model type, and neural network model type. Accuracy criteria may also include information about model uncertainty, correlation, root-mean-square (RMS) error or other statistical measurements.

Further, processor 202 may determine whether the footprint and accuracy satisfy certain criteria or algorithms (step 412). The criteria or algorithms may be determined base a particular application (e.g., an engine application). For example, processor 202 may set a limitation for the overall footprint while maintaining a threshold for the overall accuracy or any individual accuracy such that a desired combination of model types may have an overall footprint under the limitation and an accuracy above the threshold. Other criteria or algorithms may also be used.

If processor 202 determines that the footprint and accuracy of virtual sensor models 304 do not satisfy the criteria (step 412; no), processor 202 may select a different combination of model types for virtual sensor models 304 (step 414). Processor 202 may select the different combination using any appropriate algorithm.

For example, processor 202 may use a genetic algorithm to select the different combination. The genetic algorithm may be any appropriate type of genetic algorithm that may be used to find possible optimized solutions based on the principles of adopting evolutionary biology to computer science, such as chromosome, selection, mutation, reproduction operations, etc.

This selecting process may continue until the genetic algorithm converges and the desired combination of model types and accuracy of virtual sensor models 304 is selected. Other algorithms, such as any progressive searching algorithm, may also be used.

On the other hand, if processor 202 determines that the footprint and accuracy satisfy the criteria (step 412; yes), processor 202 may complete the integration process and may output the desired combination model types to other control systems or users. This selecting process may be a progressive process. That is, the desired combination of model types of virtual sensor models 304 is obtained by progressively searching the various different combinations of model types of virtual sensor models 304. The desired combination of models along with other model information, such as model structures, model data, valid input spaces (i.e., valid input ranges) and output spaces (i.e., valid output ranges), calibration data, and/or other statistical data may be stored in memory or a database for operating and controlling virtual sensor models 304.

Figure 5:
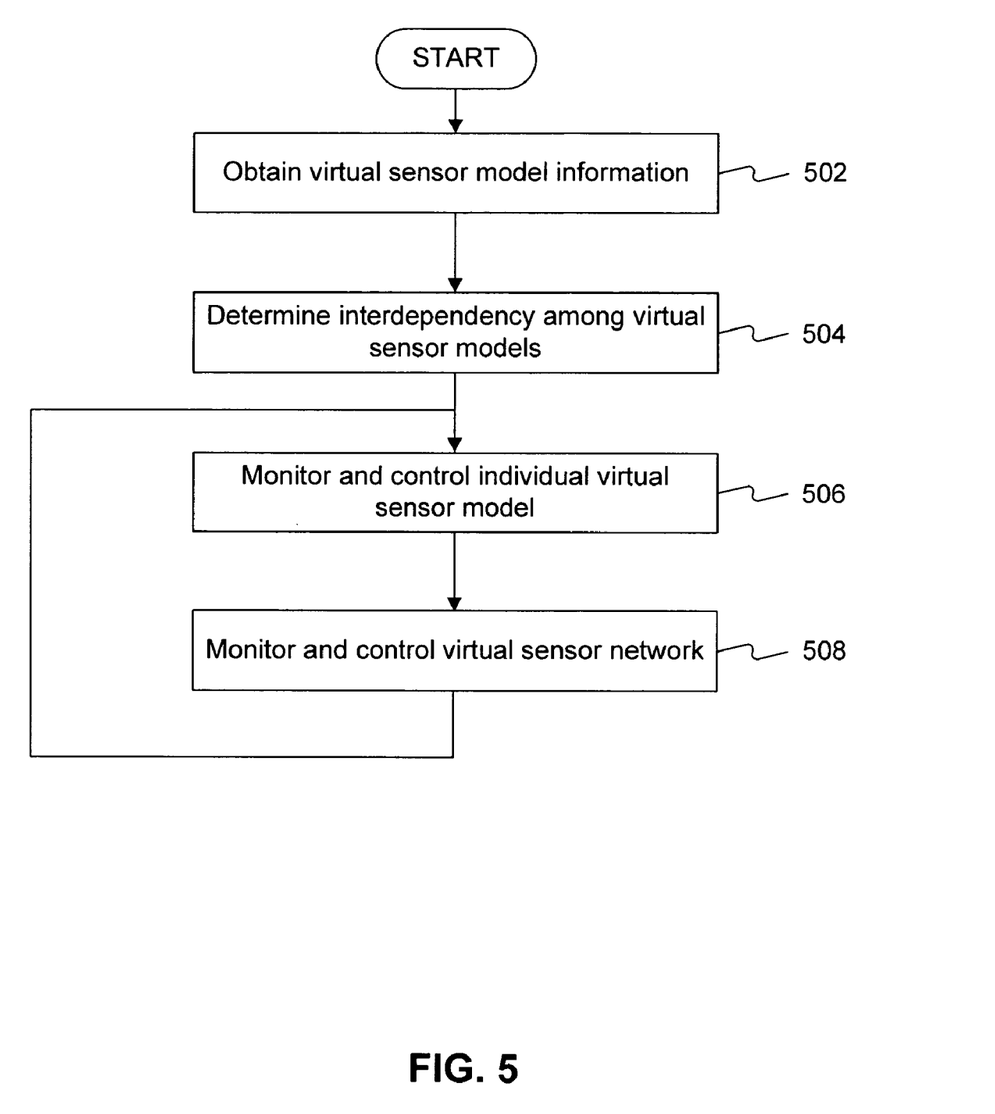
FIG. 5 illustrates a flowchart diagram of an exemplary virtual sensor network operational process consistent with certain disclosed embodiments.

Returning to FIG. 3, virtual senor network system 130 may also include virtual network controller 306. In operation, virtual network controller 306 may monitor status of virtual sensor models 304 and corresponding physical sensors, determine fitness of individual virtual sensors of virtual sensor models 304, determine fitness of virtual sensor models 304 collectively, control operation of individual virtual sensors of virtual sensor models 304, and/or report status to other computer programs or control systems, etc. FIG. 5 shows an exemplary operation process performed by virtual sensor network controller 306 as implemented in computer system 200 or processor 202.

As shown in FIG. 5, processor 202 may obtain model information of a plurality of virtual sensors of virtual sensor models 304 (step 502). For example, processor 202 may obtain model types, model structures, model data including valid input spaces and calibration data used to train and optimize the model, and statistical data, such as distributions of input and output parameters of the virtual sensor model, etc. Processor 202 may also obtain operational data from physical sensors that provide data to or are modeled by virtual sensor models 304 via sensor input interface 302. For example, processor 202 may obtain values of input and output parameters of the physical sensors and operational status of the physical sensors.

Further, processor 202 may determine interdependency among the plurality of virtual sensor models based on the model information (step 504). Interdependency, as used herein, may refer to any dependency between two or more virtual sensor models. For example, the interdependency between two virtual sensor models may refer to existence of a feedback from one virtual sensor model to the other virtual sensor model, either directly or indirectly. That is, one or more output parameters from one virtual sensor model may be directly or indirectly fed back to one or more input parameters of the other virtual sensor model.

Processor 202 may also create a table for storing the interdependency information among virtual sensor models 304. From the interdependency table, processor 202 may look up interdependent virtual sensor models for a particular virtual sensor model or any other interdependency information in real-time.

Processor 202 may also monitor and control individual virtual sensors (step 506). For example, for a backup virtual sensor, i.e., a virtual sensor becomes operational upon a predetermined event to replace a corresponding physical sensor, processor 202 may obtain predicted values of output parameters of the backup virtual sensor model and actual values of output parameters of the corresponding physical sensor represented by the virtual sensor model. Processor 202 may calculate a deviation between the predicted values and the actual values and may determine whether the deviation is beyond a predetermined threshold. If processor 202 determines that a deviation between the predicted values and the actual values is beyond the predetermined threshold, processor 202 may operate the virtual sensor model to provide predicted output parameter values to other control systems, such as ECM 120, via sensor output interface 308.

Further, for any operational virtual sensor model, processor 202 may obtain values of input parameters and output parameters of the operational virtual sensor. Processor 202 may further determine whether any input parameter to the virtual sensor or any output parameter from the virtual sensor exceeds the range of a valid input space or a valid output space, respectively.

If processor 202 determines that any individual input parameter or output parameter is out of the respective range of the input space or output space, processor 202 may send out an alarm to other computer programs, control systems, or a user of machine 100. Optionally, processor 202 may also apply any appropriate algorithm to maintain the values of input parameters or output parameters in the valid range to maintain operation with a reduced capacity.

Processor 202 may also determine collectively whether the values of input parameters are within a valid range. For example, processor 202 may use a Mahalanobis distance to determine normal operational condition of collections of input values. Mahalanobis distance, as used herein, may refer to a mathematical representation that may be used to measure data profiles based on correlations between parameters in a data set. Mahalanobis distance differs from Euclidean distance in that mahalanobis distance takes into account the correlations of the data set. Mahalanobis distance of a data set X (e.g., a multivariate vector) may be represented as $$MD_i = (X_i - \mu_x)\Sigma^{-1}(X_i - \mu_x)' \qquad (1)$$

where $\mu_x$ is the mean of X and $\Sigma^{-1}$ is an inverse variance-covariance matrix of X. $MD_i$ weights the distance of a data point $X_i$ from its mean $\mu_x$ such that observations that are on the same multivariate normal density contour will have the same distance.

During training and optimizing virtual sensor models 304, a valid Mahalanobis distance range for the input space may be calculated and stored as calibration data associated with individual virtual sensor models. In operation, processor 202 may calculate a Mahalanobis distance for input parameters of a particular virtual sensor model as a validity metric of the valid range of the particular virtual sensor model. If the calculated Mahalanobis distance exceeds the range of the valid Mahalanobis distance range stored in virtual sensor network 130, processor 202 may send out an alarm to other computer programs, control systems, or a user of machine 100 to indicate that the particular virtual sensor may be unfit to provide predicted values. Other validity metrics may also be used. For example, processor 202 may evaluate each input parameter against an established upper and lower bounds of acceptable input parameter values and may perform a logical AND operation on a collection of evaluated input parameters to obtain an overall validity metric of the virtual sensor model.

After monitoring and controlling individual virtual sensors, virtual sensor network controller 306 (e.g., processor 202) may also monitor and control collectively a plurality of virtual sensor models (step 508). That is, processor 202 may determine and control operational fitness of virtual sensor network 130. Processor 202 may monitor any operational virtual sensor model of virtual sensor models 304. Processor 202 may also determine whether there is any interdependency among any operational virtual sensor models including the virtual sensor models becoming operational. If processor 202 determines there is an interdependency between any virtual sensor models, processor 202 may determine that the interdependency between the virtual sensors may have created a closed loop to connect two or more virtual sensor models together, which is neither intended nor tested. Processor 202 may then determine that virtual sensor network 130 may be unfit to make predictions, and may send an alarm or report to control systems, such as ECM 120, or users of machine 100. That is, processor 202 may present other control systems or users the undesired condition via sensor output interface 308. Alternatively, processor 202 may indicate as unfit only interdependent virtual sensors while keeping the remaining virtual sensors in operation.

As used herein, a decision that a virtual sensor or a virtual sensor network is unfit is intended to include any instance in which any input parameter to or any output parameter from the virtual sensor or the virtual sensor network is beyond a valid range or is uncertain; or any operational condition affect the predictability and/or stability of the virtual sensor or the virtual sensor network. An unfit virtual sensor network may continue to provide sensing data to other control systems using virtual sensors not affected by the unfit condition, such interdependency, etc.

Processor 202 may also resolve unfit conditions resulting from unwanted interdependencies between active virtual sensor models by deactivating one or more models of lower priority than those remaining active virtual sensor models.

For instance, if a first active virtual sensor model has a high priority for operation of machine 100 but has an unresolved interdependency with a second active virtual sensor having a low priority for operation of machine 100, the second virtual sensor model may be deactivated to preserve the integrity of the first active virtual sensor model.

ECM 120 may obtain output parameters (e.g., output 320, such as $NO_x$ emission level) from virtual sensor network 130 via sensor output interface 308. ECM 120 may also obtain output parameters from mixed physical sensors and virtual sensor models. Further, ECM 120 may receive alarm or other status information from virtual sensor network 130 to adjust control parameters provided by the physical sensors and virtual sensor models to achieve desired stability and reliability.

When multiple ECMs are included, processor 202 may obtain input information, such as input parameters, from the multiple ECMs simultaneously over a communications network coupling the multiple ECMs. Processor 202 may also communicate output information, such as output parameters, to the multiple ECMs simultaneously over the communications network. Further, processor 202 may communicate status information, such as validity or fitness of the virtual sensor network to multiple ECMs simultaneously.

Processor 202 may also generate calibration certificates for virtual sensor network 130 and/or individual virtual sensor models 304. A calibration certificate, as used herein, may refer to any appropriate document containing calibration related information about a product (e.g., a hardware product, a software product, or a hardware/software product, etc.). The calibration information may include detailed measurement data versus a measurement specification of the product, proof of calibration for quality audits, traceability to national or international standards, proof of calibration performed according to certain standards, etc. Other information, however, may also be included.

The detailed measurement data may include any appropriate data corresponding to measurement of operational parameters of the product. For example, the detailed measurement data of virtual sensor network 130 and/or individual virtual sensor models 304 may include normal operational ranges of input and/or output parameters, such as a valid input space and/or a valid output space. Further, the detailed measurement data of virtual sensor network 130 and/or individual virtual sensor models 304 may also include uncertainty of the measurement of virtual sensor network 130 and/or individual virtual sensor models 304.

Uncertainty, as used herein, may represent an approximation or estimate of the value of the measurement. The uncertainty may include a type A uncertainty, evaluated by statistical methods, and a type B uncertainty, evaluated by means other than statistical methods. The evaluation of uncertainty by the statistical analysis of a series of observations may be termed a Type A evaluation (of uncertainty); and the evaluation of uncertainty by means other than the statistical analysis of a series of observations may be termed a Type B evaluation (of uncertainty). Both Type A uncertainty and Type B uncertainty may be represented by an estimated standard deviation, i.e., standard uncertainty, from measurement results.

Type A uncertainty and Type B uncertainty may be combined according to a certain method. For example, a combined standard uncertainty may include a square root of the sum-of-the-squares of a Type A standard uncertainty and a Type B standard uncertainty. Optionally, the uncertainty may be characterized as one of uncertainty arising from a random effect and uncertainty arising from a systematic effect. A random effect may correspond to a possible random error in a current measurement process and a systematic effect may correspond to a possible systematic error in the current measurement process.

Figure 6:
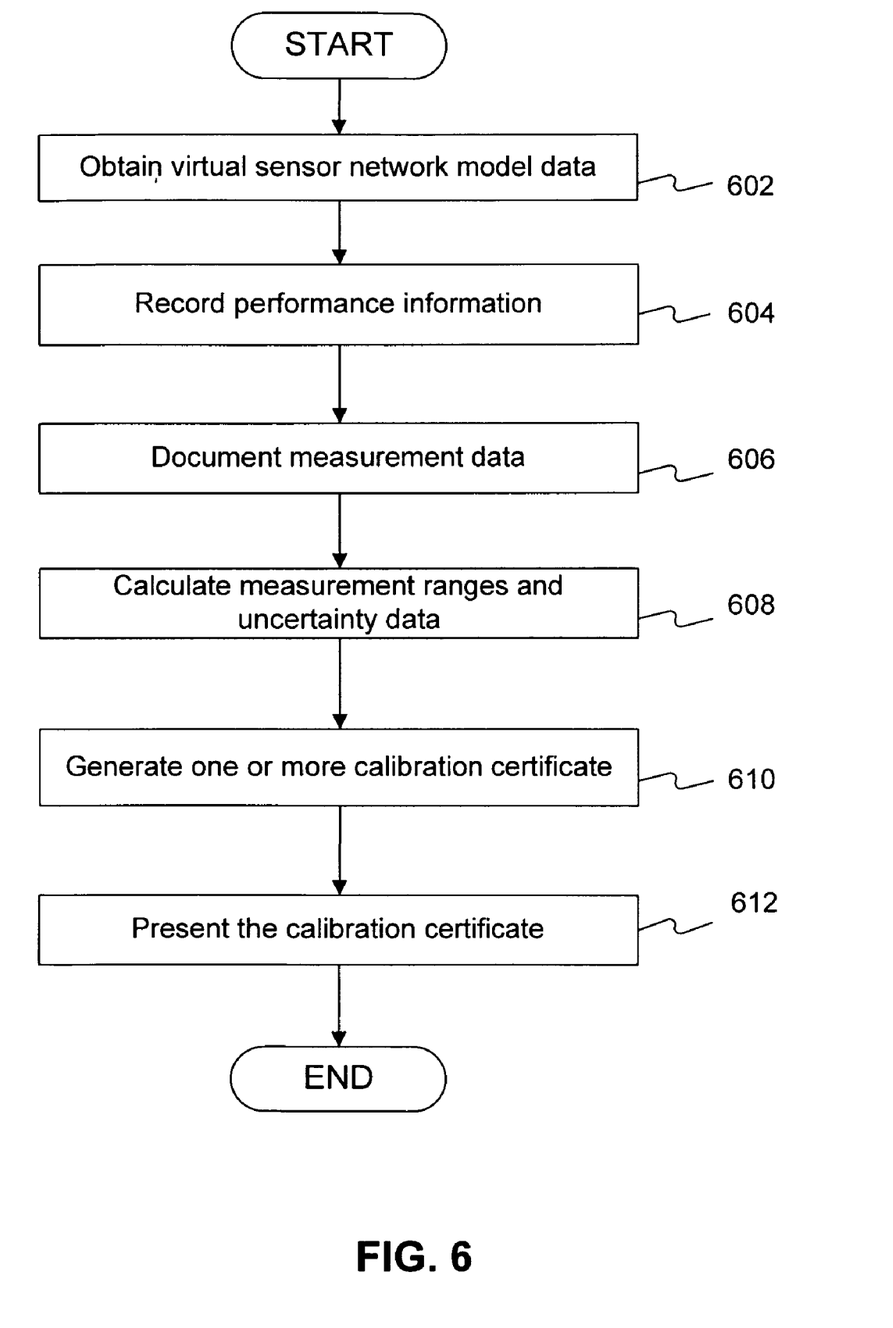
FIG. 6 illustrates a flow chart of an exemplary calibration certificate generation process consistent with certain disclosed embodiments.

The calibration certificates may be created during manufacturing, testing, operating, or recalibration processes. FIG. 6 shows an exemplary calibration certificate generation process performed by virtual sensor network controller 306 as implemented in computer system 200 or processor 202.

As shown in FIG. 6, processor 202 may obtain virtual sensor network model data (step 602). For example, processor 202 may obtain model types, model structures, model data including valid input spaces and calibration data used to train and optimize the model, and statistical data, such as distributions of input and output parameters of the virtual sensor model, etc. Processor 202 may also measure operational data from virtual sensor network 130 and/or individual virtual sensor models 304 including interdependencies among individual virtual sensor models 304, as described previously.

Processor 202 may also record performance information of virtual sensor network 130 and/or individual virtual sensor models 304 (step 604). Processor 202 may record the performance information from measured operational parameters of virtual sensor network 130 and/or individual virtual sensor models 304. For example, processor 202 may record desired and real-time ranges of input parameters and output parameters of virtual sensor network 130 and/or individual virtual sensor models 304, and may also record frequencies and values of any deviation from normal ranges and/or unfit conditions, as explained previously. Other operational parameters, however, may also be included.

Further, processor 202 may document measurement data of virtual sensor network 130 and/or individual virtual sensor models 304 (step 606). For example, processor 202 may document or record values of any appropriate operational parameters, and may also document or record appropriate environment parameters while measuring operational parameters, such as measurement temperature, engine parameters, and/or virtual sensor network configuration parameters, etc.

Processor 202 may calculate measurement ranges and uncertainty data based on the documented measurement data, the performance information, and/or the model data (step 608). Processor 202 may calculate normal operation ranges for input parameters and output parameters of virtual sensor network 130 and/or individual virtual sensor models 304, and may also calculate normal ranges of environment parameters, based on certain statistical algorithms. Further, processor 202 may calculate uncertainty data of the measurement for virtual sensor network 130 and/or individual virtual sensor models 304.

For example, processor 202 may calculate standard uncertainties from random effects in the measurement process and from systematic effects in the measurement process. Processor 202 may also calculate standard uncertainties from a Type A evaluation, a Type B evaluation, or both, for certain sources of uncertainty. The sources of uncertainty may include calibration, temperature, and operational and measurement environment, etc., which may give rise to Type A and/or Type B uncertainties.

Processor 202 may calculate standard Type A uncertainty based on any appropriate statistical method. On the other hand, processor 202 may calculate standard Type B uncertainty based on certain non-statistical methods, such as methods based on previous measurement data, empirical data, specifications, other calibration data, and/or reference uncertainty data from handbooks, etc. Other methods, however, may also be used.

Processor 202 may generate a calibration certificate for virtual sensor network 130 and/or corresponding calibration certificates for individual virtual sensor models 304 (Step 610). Processor 202 may generate the calibration certificate or certificates based on the documented measurement data, the performance information, the model data, and the measurement ranges and uncertainty data. For example, processor 202 may include in the calibration certificate the detailed measurement data including uncertainty data. Optionally, processor 202 may also include proof of calibration for quality audits, traceability to national or international standards, and proof of calibration performed according to certain standards, etc., in the calibration certificate. As explained above, processor 202 may include sources of uncertainty for virtual sensor network 130 and/or corresponding calibration certificates for individual virtual sensor models 304 in the calibration certificate.

Further, for each source of uncertainty, processor 202 may include standard uncertainties from random effects (which may include both Type A evaluation uncertainty, Type B evaluation uncertainty, or both) and standard uncertainties from systematic effects (which may also include both Type A evaluation uncertainty, Type B evaluation uncertainty, or both). Other information, however, may also be included.

After generating the calibration certificate (step 610), processor 202 may present the calibration certificate (step 612). Process 202 may store the calibration certificate in memory module 204, storage 212, or database 206, or may output the calibration certificate through I/O interface 208 or network interface 210 to other control systems or to display the calibration data to a user of virtual sensor network 130.

Industrial Applicability

The disclosed systems and methods may provide an efficient and accurate solution for providing a plurality of virtual sensors within a single machine. The plurality of virtual sensors are aware of each other such that interdependency among the plurality of virtual sensors can be avoided. Fitness of individual virtual sensor model and fitness of a collection of virtual sensor models may be obtained in real-time to facilitate control systems making proper decisions corresponding to stability of the virtual sensor network.

The disclosed systems and methods may be used in many different products, such as engines, transmission equipment, other machine components and products. Further, the disclosed systems and methods may be used to provide efficient and accurate diagnostic and prognostic systems for emission systems on vehicles.

The disclosed systems and methods may also be used in electrical and electronic systems to increase robustness of the systems by improving the predictability of system failure and identifying sources for failure to enhance so-called limp-home capability. The disclosed system and methods can also change the sensor topology to minimize exposure to sensors with below-target quality and reliability. System stability and reliability may also be improved by monitoring and controlling interactions among virtual sensors that are neither considered when building individual virtual sensors nor tested after building the individual virtual sensors The disclosed systems and methods may be used in a wide range of virtual sensors, such as sensors for engines, structures, environments, and materials, etc. In particular, the disclosed systems and methods provide practical solutions where physical sensors are expensive to be included and/or retro-fitting certain sensors is necessary. That is, the disclosed virtual sensor systems may be used to retrofit a machine with new functionalities without installing or changing new hardware devices, while such new functionalities usually require new hardware devices, such as physical sensors, to be installed. Further, the disclosed systems and methods may be used in combination with other process modeling techniques to significantly increase speed, practicality, and/or flexibility.

The disclosed systems and methods may also provide efficient methods to determine types and qualities of sensors in a product. By choosing appropriate types of sensors and appropriate qualities of sensors, product cost may be reduced and product quality may be increased. Further, a combination of physical sensors and virtual sensors may be established to further improve product quality and reliability.

The disclosed systems and methods may provide flexible solutions as well. The disclosed virtual sensor network system may be used interchangeably with physical sensors. Control systems may operate based on either a virtual sensor network system or physical sensors, without differentiating data sources.

Further, the disclosed virtual sensor network system may be used to replace physical sensors and may operate separately and independently of the physical sensors in the event of failure. The disclosed virtual sensor network system may also be used to back up physical sensors. Moreover, the virtual sensor network system may provide parameters that are unavailable from a single physical sensor, such as data from outside the sensing environment.

The disclosed systems and methods may also be used by machine manufacturers to reduce cost and increase reliability by replacing costly or failure-prone physical sensors. Reliability and flexibility may also be improved by adding backup sensing resources via the disclosed virtual sensor network system. The disclosed virtual sensor techniques may be used to provide a wide range of parameters in components such as emission, engine, transmission, navigation, and/or control, etc. Further, parts of the disclosed system or steps of the disclosed method may also be used by computer system providers to facilitate or integrate other models.

Furthermore, the disclosed systems and methods may provide a desired way to provide calibration certificates for virtual sensor networks or individual virtual sensors to improve usability of virtual sensor networks and individual virtual sensors, as well as to improve measurement accuracy.

Other embodiments, features, aspects, and principles of the disclosed exemplary systems will be apparent to those skilled in the art and may be implemented in various environments and systems.

What is claimed is:

1. A computer-implemented method for providing sensing data to a control system of a machine, comprising:
   providing a plurality of virtual sensors each having a model type, at least one input parameter, and at least one output parameter;
   integrating the plurality of virtual sensors into a virtual sensor network;
   determining interdependencies among the plurality of virtual sensors;
   obtaining operational information of the plurality of virtual sensors;
   recording measurement data and performance information of the virtual sensor network and the plurality of virtual sensors;
   generating, by at least one processor, a calibration certificate for the virtual sensor network based on the operational information, the measurement data, and the performance information, the calibration certificate comprising a document certifying that the virtual sensor network has been calibrated.

2. The method according to claim 1, wherein the calibration certificate includes normal ranges of operational parameters of the virtual sensor network and a plurality of standard uncertainties corresponding to the operational parameters.

3. The method according to 2, wherein the plurality of standard uncertainties from the calibration certificate further include:
sources of the plurality of uncertainties;
standard uncertainties based upon a Type A evaluation and a Type B evaluation, and;
standard uncertainties caused from random effects and systematic effects.

4. The method according to claim 2, wherein integrating includes:
obtaining data records corresponding to the plurality of virtual sensors;
obtaining model and configuration information of the plurality of virtual sensors;
determining applicable model types of the plurality of virtual sensors and corresponding footprints and accuracy;
selecting a combination of model types for the plurality of virtual sensors; and
calculating an overall footprint and accuracy of the virtual sensor network based on the combination of model types of the plurality of virtual sensors.

5. The method according to claim 4, further including:
determining whether the overall footprint and accuracy meets a desired threshold;
if it is determined that the overall footprint and accuracy is not desired, selecting a different combination of model types for the plurality of virtual sensors; and
repeating the step of calculating the overall footprint and accuracy and the step of selecting the different combination until a desired combination of model types is determined.

6. The method according to claim 2, wherein determining the interdependencies further includes:
determining a feedback relationship between the output parameter of one virtual sensor from the plurality of virtual sensors and the input parameter of one or more of other virtual sensors from the plurality of virtual sensor; and
storing the feedback relationship in a table.

7. The method according to claim 2, wherein
the data records include two sets of data including a first set of training data, and a second set of testing data; and
the recording further includes:
determining a first condition under which the virtual sensor network is unfit to provide one or more virtual sensor output parameter to the control system based on the determined interdependencies and the operational information; and
presenting the determined first condition to the control system.

8. The method according to claim 7, the recording further including:
monitoring the interdependencies of the plurality of virtual sensors; and
determining occurrence of the first condition when two or more virtual sensors are both interdependent and providing the sensing data to the control system.

9. The method according to claim 8, the recording further including:
determining a second condition under which an individual virtual sensor from the virtual sensor network is unfit to provide the output parameter to the control system; and
presenting the determined second condition to the control system.

10. The method according to claim 9, wherein determining the second condition further includes:
obtaining values of the input parameter of a virtual sensors;
calculating a validity metric based on the obtained values;
determining whether the calculated validity metric is within a valid range;
determining the second condition if the calculated validity metric is not within the valid range.

11. A virtual sensor network system, comprising:
a plurality of virtual sensors, each having a model type, at least one input parameter, and at least one output parameter, integrated into a virtual sensor network;
an input interface to obtain data from corresponding physical sensors;
an output interface to provide data to a control system; and
a controller configured to:
determine interdependencies among the plurality of virtual sensors;
obtain operational information of the plurality of virtual sensors;
record measurement data and performance information of the virtual sensor network and the plurality of virtual sensors;
generate a calibration certificate for the virtual sensor network based on the operational information, the measurement data, and the performance information, the calibration certificate comprising a document proving that the virtual sensor network was calibrated according to a standard.

12. The virtual sensor network system according to claim 11, wherein the calibration certificate includes normal ranges of operational parameters of the virtual sensor network and a plurality of standard uncertainties corresponding to the operational parameters.

13. The virtual sensor network system according to claim 12, wherein the plurality of standard uncertainties from the calibration certificate further include:
sources of the plurality of uncertainties;
standard uncertainties based upon a Type A evaluation and a Type B evaluation, and;
standard uncertainties caused from random effects and systematic effects in the generating process.

14. The virtual sensor network system according to claim 12, wherein the plurality of virtual sensors are integrated by:
obtaining data records corresponding to the plurality of virtual sensors;
obtaining model and configuration information of the plurality of virtual sensor;
determining applicable model types of the plurality of virtual sensors and corresponding footprints and accuracy;
selecting a combination of model types for the plurality of virtual sensors; and
calculating an overall footprint and accuracy of the virtual sensor network based on the combination of model types of the plurality of virtual sensors.

15. The virtual sensor network system according to claim 13, further including:
determining whether the overall footprint and accuracy meets a desired threshold;

if it is determined that the overall footprint and accuracy is not desired, selecting a different combination of model types for the plurality of virtual sensors; and repeating the step of calculating the overall footprint and accuracy and the step of selecting the different combination until a desired combination of model types is determined.

16. The virtual sensor network system according to claim 12, wherein, to determine the interdependencies, the controller is further configured to:

determine a feedback relationship between the output parameter of one virtual sensor from the plurality of virtual sensors and the input parameter of one or more of other virtual sensors from the plurality of virtual sensor; and store the feedback relationship in a table.

17. The virtual sensor network system according to claim 12, wherein, to record the measurement data and the performance information, the controller is further configured to:

determine a first condition under which the virtual sensor network is unfit to provide one or more virtual sensor output parameter to the control system based on the determined interdependencies and the operational information by monitoring the interdependencies of the plurality of virtual sensors and determining occurrence of the first condition when two or more virtual sensors are both interdependent and providing the sensing data to the control system; and present the determined first condition to the control system.

18. The virtual sensor network system according to claim 16, the controller is further configured to:

determine a second condition under which an individual virtual sensor from the virtual sensor network is unfit to provide the output parameter to the control system; and present the second condition to the control system to indicate the determined second condition.

19. The virtual sensor network system according to claim 17, wherein, to determine the second condition, the controller is further configured to:

obtain values of the input parameter of a virtual sensor;
calculate a mahalanobis distance based on the obtained values;
determine whether the calculated mahalanobis distance is within a valid range;
determine the second condition if the calculated mahalanobis distance is not within the valid range.

20. A machine, comprising:
an engine to provide power for the machine;
an engine electronic control module (ECM) for controlling the engine;
a plurality of physical sensors providing sensing data to the engine ECM; and
a virtual sensor network system for providing predicted sensing data to the engine ECM, wherein the virtual sensor network system includes:
a plurality of virtual sensors, each having a model type, at least one input parameter, and at least one output parameter, integrated into a virtual sensor network;
an input interface to obtain data from the plurality of physical sensors; an output interface to provide data to the engine ECM; and
a controller configured to:
determine interdependencies among the plurality of virtual sensors;
obtain operational information of the plurality of virtual sensors;
record measurement data and performance information of the virtual sensor network and the plurality of virtual sensors;
generate a calibration certificate for the virtual sensor network based on the operational information, the measurement data, and the performance information, the calibration certificate comprising a document proving that the virtual sensor network has been calibrated according to a standard; and
present the calibration certificate for the virtual sensor network to a user.

21. The machine according to claim 19, wherein the calibration certificate includes normal ranges of operational parameters of the virtual sensor network and a plurality of standard uncertainties corresponding to the operational parameters.

* * * * *

UNITED STATES PATENT AND TRADEMARK OFFICE
CERTIFICATE OF CORRECTION

| | |
|---|---|
| PATENT NO. | : 8,224,468 B2 |
| APPLICATION NO. | : 12/222007 |
| DATED | : July 17, 2012 |
| INVENTOR(S) | : Grichnik et al. |

It is certified that error appears in the above-identified patent and that said Letters Patent is hereby corrected as shown below:

On the Title Page

Page 3, Column 2, (Other Publications), line 3, delete "InformationTechnology" and insert -- Information Technology --.

Page 3, Column 2, (Other Publications), line 13, delete "Ser. 1335 (2002)," and insert -- Ser. I335 (2002), --.

Page 3, Column 2, (Other Publications), line 48, delete "Nox" and insert -- NOx --.

In the Specification

Column 1, lines 7-8, delete "filed Nov. 2, 2007" and insert -- filed Nov. 2, 2007, --.

Column 4, line 13, delete "such as such as compression ratios," and insert -- such as compression ratios, --.

Column 13, line 33, delete "Industrial Applicability" and insert -- INDUSTRIAL APPLICABILITY --.

Column 13, line 60, delete "sensors" and insert -- sensors. --.

In the Claims

Column 15, line 7, in Claim 3, delete "The method according to 2," and insert -- The method according to claim 2, --.

Signed and Sealed this
Eleventh Day of August, 2015

Michelle K. Lee
*Director of the United States Patent and Trademark Office*

CERTIFICATE OF CORRECTION (continued)
U.S. Pat. No. 8,224,468 B2

Column 15, line 13, in Claim 3, delete "evaluation, and;" and insert -- evaluation; and --.

Column 16, line 48, in Claim 13, delete "evaluation, and;" and insert -- evaluation; and --.

Column 17, lines 30-31, in Claim 18, delete "The virtual sensor network system according to claim 16, the controller is further configured to:" and insert -- The virtual sensor network system according to claim 17, the controller is further configured to: --.

Column 17, lines 37-39, in Claim 19, delete "The virtual sensor network system according to claim 17, wherein, to determine the second condition, the controller is further configured to:" and insert -- The virtual sensor network system according to claim 18, wherein, to determine the second condition, the controller is further configured to: --.

Column 17, lines 37-39, in Claim 21, delete "The machine according to claim 19," and insert -- The machine according to claim 20, --.